Patented Oct. 19, 1943

2,331,923

UNITED STATES PATENT OFFICE 2,331,923

PREPARATION OF COMPOUNDS FOR LUBRICANTS, ETC.

John M. Musselman, South Euclid, Ohio, assignor to The Standard Oil Company, Cleveland, Ohio, a corporation of Ohio No Drawing. Application January 30, 1941, Serial No. 376,675

20 Claims. (Cl. 252—48)

Degras has been known for some time as an addition to mineral oils for lubrication purposes, but such combination has no value in internal combustion engines. I have now found however that by reacting upon degras or other wax as set forth more in detail hereinafter, products may be had which are of particular utility in several respects for lubricating usages even under very drastic high temperature conditions.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

The invention will be readily understood by reference to an illustrative instance of its practice:

Degras is heated with a sulphide of phosphorus, for instance $P_2S_5$, until a spontaneous exothermic reaction occurs at about 300° F., and ceases. Generally, a reaction time of an hour or slightly more or less is involved. If molecular amounts, as 1 mol of the degras and ½ mol of the phosphorus pentasulphide be employed, useless dilution with unreacted ingredient material may be avoided, although such is not harmful. A slight excess of the theoretical amount of the phosphorus pentasulphide has some advantage in establishing reaction driving conditions and forcing the reaction of the degras to completion. After the reaction, insoluble matter of sludge-like character can be separated, as by centrifuging or filtering, and the reaction product appears as clear material. This reaction product is next converted into a metal compound thereof by heating with about 10 per cent of zinc oxide at around 250° F. for an hour, and finally any unreacted zinc oxide or solid material is separated by centrifuging or filtering. For lubricant usage, such for instance as added to an S. A. E. 20 lubricating oil, the ordinary tendency to break-down is inhibited, and the lubricant preserves outstandingly clean metal surfaces. In addition, the cold test of the oil is lowered. The amount of the metal compound of the reaction product added to the oil for internal combustion engine usage may be for instance 0.5 to 3 per cent ordinarily. This may be raised if desired for Diesel engine usage and prevention of ring sticking. In general, 0.1 to 10 per cent may be employed for internal combustion engines. For E. P. oils as for lubricating hypoid type gears, 5 to 25 per cent of the product is satisfactory, and for grease usages it may be employed in amount of 5 to 100 per cent, as desired in view of the particular type of service.

As another example: Similar amounts of beeswax and phosphorus pentasulphide are reacted as above, and then the product is further reacted with zinc oxide to form the zinc compound.

As another example: Similar amounts of degras and phosphorus pentasulphide are reacted as above, and then the product is further converted to the tin compound by reacting with tin oxide.

As another example: A similar reaction product of degras and phosphorus sulphide is further reacted to conversion to the aluminum compound.

Likewise, other waxes, such as lanolin, carnauba, Japan wax, sperm oil, etc., may be employed as raw material. Other reactive phosphorus sulphides may be employed, as the sesquisulphide, etc. And, other metals applicable are aluminum, calcium, beryllium, sodium, potassium, magnesium, tin, etc. That is, any reactive metal. The metal may be introduced by reacting its oxide or hydroxide, or in some cases it is desirable to first make a sodium or potassium compound of the reaction product, as by treating with the hydroxide, and then by double de-composition reaction precipitate this with a soluble salt, such as sulphate, chloride, etc., of the metal desired in the final product.

An S. A. E. 20 lubricating oil containing 1 per cent of the zinc salt of phosphorus sulphide reacted degras as above, tested in a test engine of Ethyl Gasoline Corporation type for 20 hours straight running at jacket temperature 212° F. and sump temperature 300° F., showed the following results: viscosity increase 99, acid number 1.1, sludge 0.5 per cent, lacquer on piston 4 mg., piston skirt rating 2.5, motor condition very clean. In contrast, the S. A. E. 20 oil without the addition agent in a similar run showed viscosity increase 413, acid number 2, sludge 4.0 per cent, lacquer 80.0 mg., piston skirt rating 7.0, motor condition medium sludge formation.

The S. A. E. 20 oil with 1 per cent of the zinc salt of the phosphorus sulphide degras reaction product, tested by the A. S. T. M. cold test, was fluid at minus 15° F., whereas the oil without the addition product was solid at 20° F. Similarly, the aluminum and tin salts of such reaction product showed a cold test of minus 20° F.

Other modes of applying the principle of the invention may be employed, change being made as regards the details described, provided the features stated in any of the following claims, or the equivalent of such, be employed.

I herefore particularly point out and distinctly claim as my invention:

1. A lubricant comprising a metal compound of the reaction product of degras with phosphorus pentasulphide.

2. A lubricant comprising a metal compound of the reaction product of sperm oil with phosphorus pentasulphide.

3. A lubricant comprising a metal compound of the reaction product of an ester wax with phosphorus pentasulphide.

4. A lubricant comprising a metal compound of the reaction product of degras with a sulphide of phosphorus.

5. A lubricant comprising a metal compound of the reaction product of beeswax with a sulphide of phosphorus.

6. A lubricant comprising a metal compound of the reaction product of sperm oil with a sulphide of phosphorus.

7. A lubricant comprising a metal compound of the reaction product of an ester wax with a sulphide of phosphorus.

8. A lubricant comprising a metal compound of the reaction product of degras with a sulphide of phosphorus, disseminated in a lubricating oil.

9. A lubricant comprising a metal compound of the reaction product of beeswax with a sulphide of phosphorus, disseminated in a lubricating oil.

10. A lubricant comprising a metal compound of the reaction product of an ester wax with a sulphide of phosphorus, disseminated in a lubricating oil.

11. A lubricant comprising a metal compound of the reaction product of degras with phosphorus pentasulphide, disseminated in a lubricating oil.

12. A lubricant comprising a metal compound of the reaction product of sperm oil with phosphorus pentasulphide, disseminated in a lubricating oil.

13. A lubricant comprising a metal compound of the reaction product of an ester wax with phosphorus pentasulphide, disseminated in a lubricating oil.

14. A lubricant comprising a calcium compound of the reaction product of an ester wax with a sulphide of phosphorus.

15. A lubricant comprising a calcium compound of the reaction product of an ester wax with phosphorus pentasulphide.

16. A lubricant comprising a calcium compound of the reaction product of degras with a sulphide of phosphorus.

17. A lubricant comprising a calcium compound of the reaction product of degras with phosphorus pentasulphide.

18. A lubricant comprising a calcium compound of the reaction product of sperm oil with phosphorus pentasulphide.

19. A lubricant comprising a calcium compound of the reaction product of degras with phosphorus pentasulphide, disseminated in a lubricating oil.

20. A lubricant comprising a calcium compound of the reaction product of sperm oil with phosphorus pentasulphide, disseminated in a lubricating oil.

JOHN M. MUSSELMAN.

CERTIFICATE OF CORRECTION.

Patent No. 2,331,923. October 19, 1943.

JOHN M. MUSSELMAN.

It is hereby certified that error appears in the printed specification of the above numbered patent requiring correction as follows: Page 2, first column, line 30, claim 9, for "beeswax" read --sperm oil--; and that the said Letters Patent should be read with this correction therein that the same may conform to the record of the case in the Patent Office.

Signed and sealed this 14th day of December, A. D. 1943.

(Seal)

Henry Van Arsdale,
Acting Commissioner of Patents.